United States Patent
Kehr et al.

[15] 3,650,802
[45] Mar. 21, 1972

[54] PROCESS FOR COATING A SUBSTRATE WITH A POLYENE/POLYTHIOL COMPOSITION

[72] Inventors: Clifton Leroy Kehr, Silver Springs; James Leverette Guthrie, Ashton, both of Md.

[73] Assignee: W. R. Grace & Co.

[22] Filed: Mar. 7, 1969

[21] Appl. No.: 805,354

Related U.S. Application Data

[63] Continuation-in-part of Ser. No. 793,534, Jan. 23, 1969.

[52] U.S. Cl. ..................117/47 R, 117/62.2, 117/71 R, 117/72, 117/73, 117/76 P, 117/93.4 A, 117/97, 117/132 B, 117/124 E, 117/161 R, 117/155 UA, 156/327
[51] Int. Cl. .........................B44d 1/092, B44d 1/36
[58] Field of Search ............117/72, 47 R, 132 CB, 132 B, 117/71 R, 62.2, 161 R

[56] References Cited

UNITED STATES PATENTS 2,893,906  7/1959  Taylor............................117/132 B X
2,957,786  10/1960  Baumhart et al..............117/132 CB X
3,271,182  9/1966  Varlet....................................117/72 X
3,271,183  9/1966  Varlet....................................117/72 X Primary Examiner—William D. Martin
Assistant Examiner—Ralph Husack
Attorney—Richard P. Plunkett and Kenneth E. Prince

[57] ABSTRACT

This invention relates to curing of coatings, sealants and laminates under ambient conditions without affecting the pot life of a curable liquid composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four which comprises having present at least a minor amount of an iron-containing material either as a portion of the substrate, as a primer coat for the substrate or as a top coat for the curable composition. In the case where oxygen is excluded from the reaction, a minor amount of an oxime ester is added to the system to assure curing to a solidified product.

41 Claims, No Drawings

PROCESS FOR COATING A SUBSTRATE WITH A POLYENE/POLYTHIOL COMPOSITION

This application is a continuation-in-part of our copending application having Ser. No. 793,534 filed Jan. 23, 1969.

This invention relates to curing of coatings, sealants and laminates under ambient conditions without affecting the pot life of a curable liquid composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four which comprises having present at least a minor amount of an iron-containing material either as a portion of the substrate, as a primer coat for the substrate or as a top coat for the curable composition. In the case where oxygen is excluded from the reaction, a minor amount of an oxime ester is added to the system to assure curing to a solidified product.

Many polymeric products are supplied for use in coatings, sealants or other such applications in a form of a liquid or a paste. These materials are expected to cure to rigid or elastomeric materials by the action of air, moisture, or heat, by evaporation of volatile components, or by the action of irradiation. Many of these materials have the disadvantage that the curing reactions may take place prematurely in the package. Even in well known two component systems, the mixed material must be used very soon after mixing because of the short pot life of the reactive system.

One object of the instant invention is to produce a curable liquid composition for coatings, sealants, laminates or other such applications which will cure rapidly under ambient conditions. Another object of the instant invention is to produce a liquid curable composition which is unaffected by exposure to the atmosphere. Still another object of the instant invention is to produce a liquid curable composition which will cure rapidly on contact with a minor amount of an iron containing material as a substrate, a primer for the substrate or a top coat for the liquid curable composition. These and other objects will become apparent from a reading hereafter.

Summarily, this invention comprises withholding from a packaged curable liquid polyene-polythiol composition, an iron-containing catalyst therefor and incorporating said catalyst into the system as the substrate to be coated, as a primer for the substrate to be coated or as a top coat for the curable liquid composition. Prime coats are commonly used to promote adhesion, to act as barrier coats or for other purposes, but as far as is known, have not been used as carriers for reactive ingredients intended to cause curing. The present invention teaches the use of an iron-containing catalyst as a reactive prime coat alternatively as a substrate or a reactive top coat, the invention being the presence of the catalyst solely in the substrate, primer or top coat and not in the bulk premixed liquid curable polyene-polythiol composition. In the instances where oxygen is excluded from the reaction, e.g., wherein the iron-containing catalyst is present in the substrate or as a primer for the substrate and the polyene-polythiol composition is applied directly thereon then, it is necessary to add an oxime ester to the polyene-polythiol composition to effect curing to a hardened solidified product.

According to the invention there is provided a process for preparing coatings, sealants, and laminates which harden quickly under ambient conditions comprising the steps of applying an iron-containing catalyst, with or without a solvent or diluent, as desired, as a prime coat on the substrate to be coated, and thereafter applying to said prime coat a liquid composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four, to form a hardened coating on said substrate. The addition of minor amounts of an oxime ester to the liquid curable polyene-polythiol composition causes curing to a solid, self-supporting cured polythioether even under inert conditions, e.g., in an argon atmosphere.

The amount of iron in the catalyst operable to cause curing of the liquid polyene-polythiol composition is at least 0.00001 percent by weight based on the liquid polyene-polythiol composition when the catalyst is applied as a primer, topcoat or as the substrate, per se. Ordinarily when the iron-containing catalyst is added as a prime coat or top coat, the amount of iron is usually in the range 0.0001–0.01 percent by weight of the polyene-polythiol composition. Where the iron-containing catalyst is the substrate per se, e.g., an iron pipe, any amount of iron in the iron-containing catalyst in excess of 0.00001 percent by weight of the polyene-polythiol composition may be present and the invention is still operable.

Iron-containing materials which are operable in the instant invention as a catalyst are many and varied and include iron as well as iron containing organic and inorganic compounds. Thus for example, operable compounds include, but are not limited to, iron, iron salts such as sulfate, nitrate, ferricyanide, ferrorcyanide, chloride, ammonium sulfate and the like. Organic iron salts are also operable and include, but are not limited to, oxalate, stearate, naphthenate, citrate and iron chelate compounds such as acetylacetonate, benzoylacetophenonate, ferrocene and the like. Other operable iron compounds include, but are not limited to, iron acetate, iron orthoarsenate, iron orthoarsenite, iron boride, iron hydroxide, iron iodide, iron lactate, iron maleate, iron oleate, iron oxide, iron pyrophosphate, iron metasilicate, iron sulfide, iron sulfite, iron thiocyanate, and the like. The aforesaid list of iron compounds is merely illustrative and by no means exhaustive, suffice it to say that any iron containing material in the operable amount set out herein will cause relatively rapid curing of the polyene-polythiol composition under ambient conditions.

The amount of oxime ester employed is in the range 0.1 to 5 percent by weight based on the liquid polyene-polythiol composition.

Operable oxime esters which can be added to the liquid polyene-polythiol composition of the instant invention and cause curing in the presence of the iron-containing catalyst under inert conditions are many and varied. Examples of operable oxime esters include, but are not limited to, dimethylglyoxime dibenzoate, quinone dioxime dimethoxybenzoate, quinone dioxime dichlorobenzoate, diphenylglyoxime dibenzoate, glyoxime dibenzoate, quinone dioxime diacetate, terephthalaldehyde dioxime dibenzoate, dimethylglyoxime diacetate, dimethylglyoxime distearate, quinone dioxime dibenzoate, dimethylglyoxime monoacetate, quinone dioxime dibenzenesulfonate, dimethylglyoxime monobenzoate, terephthalaldehyde dioxime monobenzoate, furil dioxime distearate, diphenylglyoxime distearate, dimethylglyoxime adipate, terephthalaldehyde dioximde distearate, 3-phenyl-4,5-dihydro-6-oxo-1,2-oxazine, cyclohexanone oxime benzoate, 4-benzoylbutyric acid oxime benzoate, quinone dioxime dinitrobenzoate, 2,4-pentanedione dioxime dibenzoate, quinone dioxime distearate, benzoylpropionic acid oxime benzoate, quinone dioxime diheptanoate, cycloheptanone oxime benzoate, 2-methylcyclohexanone oxime benzoate, 1-phenyl-1,2-propane-dione dioxime distearate, glyoxime distearate, 2,4-pentane-dione dioxime distearate, quinone dioxime dibutyrate, benzophenone oxime stearate, benzaldoxime benzoate, benzaldoxime stearate, glyoxime diacetate, levulinic acid oxime benzoate, and the like. Various other oxime esters are obvious to one skilled in the art and are operable herein.

The polythiols and one group of operable polyenes which can be cured rapidly to form coatings, sealants, and laminates are set out in a copending application assigned to the same assignee having Ser. No. 617,801, now abandoned, filed Feb. 23, 1967 and are incorporated herein by reference. That is, one group of polyenes operable in the instant invention are those having a molecular weight in the range 50 to 20,000, a viscosity ranging from 0 to 20 million centipoises at 130° C. of the general formula: $[A]-(X)_m$ wherein X is a member of the group consisting of

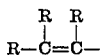

and $R-C \equiv C-$; $m$ is at least two; R is independently selected from the group consisting of hydrogen, halogen, aryl, substituted aryl, cycloalkyl, substituted cycloalkyl, aralkyl, substituted aralkyl and alkyl and substituted alkyl groups containing one to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hereto atoms such as N, S, P or O but contains primarily carbon-carbon, carbon-oxygen or silicon-oxygen containing chain linkages without any reactive carbon to carbon unsaturation.

Examples of said operable polyenes include, but are not limited to 1. crotyl-terminated polyurethanes which contain two "reactive" double bonds per average molecule in a near terminal position of the average general formula:

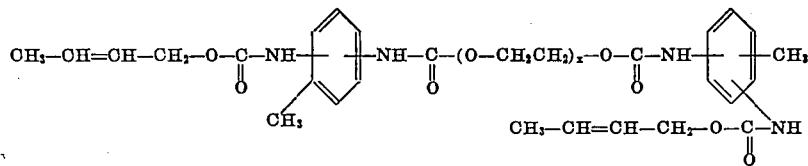

wherein x is at least 1, 2. ethylene/propylene/non-conjugated diene terpolymers, such as "Nordel 1040" manufactured by duPont which contains pendant "reactive" double bonds of the formula: $-CH_2-CH \quad CH-CH_3$, 3. the following structure which contains terminal "reactive" double bonds:

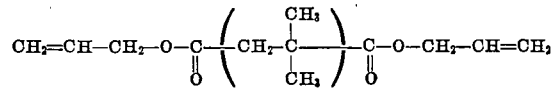

where x is at least 1, and 4. the following structure which contains near terminal "reactive" double bonds

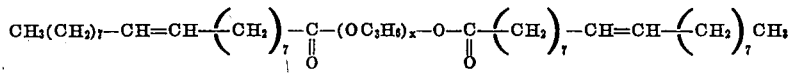

where x is at least 1.

Various other polyenes of this type are operable. For example, the polyene can be the reaction product of polytetramethylene ether glycol having a molecular weight of about 2000 and allyl isocyanate in a mole ratio of 1:2, respectively. The polyene can also be the reaction product of a solid polyester diol and allyl isocyanate in a mole ratio of 1:2, respectively. The polyene can also be the reaction product of polyoxypropylene diol having a molecular weight of about 2000, tolylene 2,4-diisocyanate and allyl alcohol in a mole ratio of 1:2:2, respectively. The polyene can also be the reaction product of a phthalate or a succinate esterol derived from polytetramethylene ether glycol and allyl isocyanate having a molecular weight of about 4000. The polyene can also be the reaction product of polytetramethylene ether glycol having a molecular weight of about 3000 and allyl isocyanate in a mole ratio of 1:2, respectively. The polyene can also be the reaction product of polyoxypropylene triol having a molecular weight of about 1000 to 6000 and allyl isocyanate in a mole ratio of 1:3, respectively. The polyene can also be triallyl urea. Another operable polyene is that which is the reaction product of 1,4-butanediol and allyl isocyanate in a mole ratio of 1:2, respectively. The polyene can also be formed by reacting either (a) an organic epoxide containing at least two

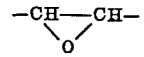

groups in its structure with a member of the group consisting of hydrazine, primary amines, secondary amines, tertiary amines, amine salts, organic alcohols, and organic acids, wherein said group members contain at least one organic substituent containing a reactive ethylenically or ethynylically unsaturated group or (b) an organic epoxide containing at least one organic substituent containing a reactive ethylenically or ethynylically unsaturated group with a member of the group consisting of hydrazine and an organic material containing at least two active hydrogen functions from the group consisting of

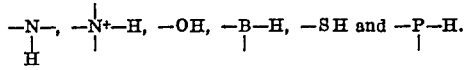

Examples of polyenes of this type would be the reaction product of one mole of diglycidyl ether of Bisphenol A and two moles of either allyl amine, allyl hydrazine, or diallyl amine. Another polyene of this type is the reaction product of one mole of polyoxypropylene triamine and three moles of allyl glycidyl ether.

As used herein polyenes and polyynes refer to simple or complex species of alkenes or alkynes having a multiplicity of pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate butenediol condensation polymers and the like.

A third group of polyenes operable in this invention includes those polyenes in which the reactive unsaturated carbon to carbon bonds are conjugated with adjacent unsaturated groupings. Examples of operable reactive conjugated ene systems include, but are not limited to, the following:

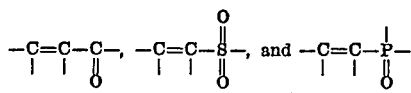

A few typical examples of polymeric polyenes which contain conjugated reactive double bond groupings such as those described above are poly(ethylene ether) glycol diacrylate having a molecular weight of about 750, poly(tetramethylene ether) glycol dimethacrylate having a molecular weight of about 1175, the triacrylate of the reaction product of trimethylolpropane with 20 moles of ethylene oxide, and the like. Another polyene of this type is the triacrylate of the reaction product of trimethylol propane and about 3–30 moles of ethylene oxide. Still another polyene of this type is cellulose acetate methacrylate.

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain. For purposes of brevity all of these positions will be referred to generally as "terminal" unsaturation.

The liquid polyenes operable in the instant invention contain one or more of the following types of non-aromatic and non-conjugated "reactive" carbon to carbon unsaturation:

(1) $-CH=CH-$      (5) $-\underset{|}{C}=\underset{|}{C}-$ (2) $-C\equiv C-$      (6) $-\underset{|}{C}=CH-$ (3) $-CH=CH_2$      (7) $-CH=\underset{|}{C}-$ (4) $-C\equiv CH$      (8) $-\underset{|}{C}=CH_2$ These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as

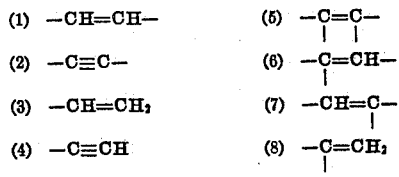

and the like so as to form a conjugated system of unsaturated bonds exemplified by the following structure:

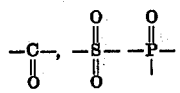

etc. On the average the polyenes must contain 2 or more "reactive" unsaturated carbon to carbon bonds/molecule and have a viscosity in the range from 0 to 20 million centipoises at 130° C. Included in the term "polyenes" as used herein are those materials which in the presence of an inert solvent, aqueous dispersion or plasticizer fall within the viscosity range set out above 130° C. Operable polyenes in the instant invention have molecular weights in the range 50–20,000, preferably 100 to 10,000.

As used herein the term "reactive" unsaturated carbon to carbon groups means groups having the structures as shown in 1–8 supra which will react under proper conditions as set forth herein with thiol groups to yield the thioether linkage

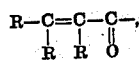

as contrasted to the term "unreactive" carbon to carbon unsaturation which means

groups when found in aromatic nuclei (cyclic structures exemplified by benzene, pyridine, anthracene, and the like) which do not under the same conditions react with thiols to give thioether linkages. In the instant invention coating, sealant and laminate products from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned -SH functional groups per average molecule.

On the average the polythiols must contain 2 or more —SH groups/molecule. They usually have a viscosity range of 0 to 20 million centipoises (cps) at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8$—$(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S, P or O but primarily contains carbon-hydrogen, carbon-oxygen, or silicone-oxygen containing chain linkages free of any reactive carbon to carbon unsaturation.

One class of polythiols operable with polyenes in the instant invention to obtain essentially odorless polythioether products are esters of thiol-containing acids of the general formula: HS-$R_9$-COOH where $R_9$ is an organic moiety containing no "reactive" carbon to carbon unsaturation with polyhydroxy compounds of the general structure: $R_{10}$—$(OH)_n$ where R is an organic moiety containing no "reactive" carbon to carbon unsaturation and n is 2 or greater. These components will react under suitable conditions to give a polythiol having the general structure;

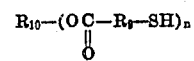

where $R_9$ and $R_{10}$ are organic moieties containing no "reactive" carbon to carbon unsaturation and n is 2 or greater.

Certain polythiols such as the aliphatic monomeric polythiols (ethane dithiol, hexamethylene dithiol, decamethylene dithiol, tolylene-2,4-dithiol, etc., and some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low order level include but are not limited to esters of thioglycolic acid (HS-CH$_2$COOH), α-mercaptopropionic acid (HS—CH(CH$_3$)—COOH and β—mercaptopropionic acid (HS—CH$_2$CH$_2$COOH) with polyhydroxy compounds such as glycols, triols, tetraols, pentaols, hexaols, etc. Specific examples of the preferred polythiols include but are not limited to ethylene glycol bis(thioglycolate), ethylene glycol bis(β—mercaptopropionate), trimethylolpropane tris(thioglycolate), trimethylolpropane tris(β—mercaptopropionate), pentaerythritol tetrakis (thioglycolate) and pentaerythritol tetrakis (β—mercaptopropionate), all of which are commercially available. A specific example of a preferred polymeric polythiol is polypropylene ether glycol bis(β—mercaptopropionate) which is prepared from polypropylene ether glycol (e.g., Pluracol P2010, Wyandotte Chemical Corp.) and β—mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor application.

As used herein the term "liquid curable compositions" means a liquid composition having a viscosity in the range 0 to 20 million centipoises at 130° C. which is solidified by curing on contact with the iron-containing catalyst disclosed herein under ambient conditions.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (f) of three. A polymeric dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction procceds to 100% of the theoretical value for complete reaction, the functionality (assuming 100 percent pure starting materials) would be 2.0. If however, the reaction were carried to only 90 percent of theory for complete reaction, about 10 percent of the molecules present would have only one ene functional group, and there may be a trace of material that would have no ene functional groups at all. Approximately 90 percent of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still be rapidly cured by the process of the instant invention.

To obtain the maximum strength, solvent resistance, creep resistance, heat resistance, and freedom from tackiness the reaction components consisting of the polyenes and polythiols of this invention are formulated in such a manner as to give solid, cross-linked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The compositions to be cured, i.e., (converted to solid resin or elastomeric coatings, sealants or laminates) in accord with the present invention may, if desired, include such additives as antioxidants, dyes, inhibitors, activators, fillers, pigment, antistatic agents, flame-retardant agents, thickeners, thixotropic agents, surface-active agents, viscosity modifiers, extending oils, plasticizers, tackifiers and the like within the scope of this invention. Such additives are usually blended with the polyene or polythiol prior to or during the compounding of the polyene and polythiol. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the liquid polyene-polythiol composition by weight and preferably 0.005–300 parts on the same basis.

In all the curable liquid systems herein the compositions consist of 2 to 98 parts by weight of a polyene containing at least 2 reactive unsaturated carbon to carbon bonds per molecule, 98 to 2 parts by weight of a polythiol containing at least 2 thiol groups per molecule and when necessary, i.e., under inert conditions, 0.1 to 5% by weight of the polyene-polythiol composition of an oxime ester as a synergistic agent for the iron-containing catalyst.

The compounding of the components prior to curing can be carried out in several ways. Since the oxime esters used in this invention do not by themselves under ambient conditions have a catalytic effect on the curing of polyenes with polythiols but only act as a synergistic agent for the iron-containing catalyst and since iron and its compounds used in this invention act as a catalyst by themselves only in the presence of air, all ingredients except the iron containing catalyst are mixed to give a stable system. The iron-containing catalyst is applied separately as a prime coat to the substrate with or without a diluent or solvent as deemed necessary depending upon the phase of the iron-containing material or as a top coat for the polyene-polythiol composition. Additionally, if the substrate per se contains an iron-containing material, no additional catalyst is necessary and only the addition of an oxime ester to the polyene-polythiol composition is required to effect curing. The iron compound could be deposited as a prime coat in solution or as a dust in a pattern electrostatically or by other methods to cause complete curing or selective curing only in certain regions of a curable polymer. Various other compounding procedures are obvious to one skilled in the art.

The following examples will aid in explaining but expressly not limit the instant invention. Unless otherwise noted, all parts and percentages are by weight.

PREPARATION OF POLYENE

EXAMPLE I

To a 2-liter flask equipped with stirrer, thermometer, and gas inlet and outlet was charged 450 g. (0.45 mole) of polytetramethylene ether glycol having a hydroxyl number of 112 and molecular weight of 1000, along with 900 g. (0.45 mole) of polytetramethylene ether glycol having a hydroxyl number of 56 and a molecular weight of 2000, both commercially available from Quaker Oats Co. The flask was heated to 110° C. under vacuum and nitrogen and maintained thereat for 1 hour. The flask was then cooled to approximately 70° C. where at 0.1 g. of dibutyl tin dilaurate was added to the flask. A mixture of 78 g. (0.45 mole) of tolylene diisocyanate and 78 g. (0.92 mole) of allyl isocyanate was thereafter added to the flask dropwise with continuous stirring. The reaction was maintained at 70° C. for 1 hour after addition of all the reactants. The thus formed allyl terminated polyene will hereinafter be referred to as Prepolymer A.

COATING PROCESSES

EXAMPLE II

A solution of 100 mg. of ferric acetylacetonate in 3 ml. of acetone was poured into an aluminum weighing dish. The acetone was allowed to evaporate, depositing a prime coat of ferric acetylacetonate on the bottom of the dish. A solution was made up from 30 g. of Prepolymer A from Example I, 5 g. of "Benzoflex 988," a commercially available plasticizer from Velsicol Chemical Corp., 2.3 g. of pentaerythritol tetrabis (β-mercaptopropionate), a commercially available polythiol from Carlisle Chemical Corp. under the trade name "Q-43" and 0.5 g. of cyclohexanone oxime benzoate. The solution was poured into the aluminum weighing dish containing the ferric acetylacetonate to a depth of one-fourth of an inch and allowed to stand at ambient temperature for 1 week. At this time there was no apparent curing on the top surface, so as much as the liquid solution as possible was poured into a second aluminum dish. There was a layer of cured polythioether polymer on the bottom of the first dish where the iron compound was situated. This was stripped out and was found to have a thickness of 85 mils and a Shore A hardness of 49.

EXAMPLE III

A glass plate was painted with a solution of 100 mg. of ferric acetylacetonate in 3 ml. of acetone. The uncured portion of the polymer solution of Example II which was poured into a separate aluminum dish was poured over the painted glass plate and spread thereover with a glass rod. After 3 minutes the plate was washed with isopropanol and hot water removing all the uncured polymer except that in the ferric acetylacetonate treated area. On characterization there was found to be a 3 mil coating of a polythioether polymer on the glass plate.

EXAMPLE IV

Ferric acetylacetonate was dusted onto one end of 1 inch wide strip of black plate steel. A solution comprising 30 g. of Prepolymer A from Example I, 5 g. "Benzoflex 988," 2.3 g. "Q-43" and 0.5 g. of cyclohexanone oxime benzoate was added throughout both the ferric acetylacetonate treated end of the black plate steel and the untreated end. After 5 minutes an attempt was made to wipe off all of the liquid polyene-polythiol composition. All of the polyene-polythiol composition was removed from the untreated end of the steel but a 2 mil coating of the cured polythioether remained on the end of the black plate steel that had been treated with ferric acetylacetonate.

EXAMPLE V

An iron pipe was coated with a solution comprising 30 g. of Prepolymer A from Example I, 2.3 g. "Q-43" and 0.5 g. of cyclohexanone oxime benzoate. The coating was applied around the entire circumference of the pipe to a depth of approximately 5 mils. At the end of 5 minutes, a cured solidified hardened polythioether coating (5 mils thick) resulted on the iron pipe.

EXAMPLE VI 10 g. of Prepolymer A from Example I was admixed with 1 g. pentaerythritol tetrakis (β-mercaptopropionate) commercially available from Carlisle Chemical Co. under the trade name "Q-43." The thus formed admixture was applied to commercially available bond paper by means of a Baker film applicator manufactured by Gardner Manufacturing Co., Bethesda, Md. to a depth of 2 ml. A solution of 3 g. of ferric ammonium sulfate in 200 ml. of water was prepared. The coated paper was immersed in the iron-containing solution for 5 seconds, removed, and allowed to cure in air. After 10 minutes a cured hardened polythioether coating resulted on the paper.

EXAMPLE VII 10 g. of Prepolymer A from Example 1 were admixed with 1 g. pentaerythritol tetrakis (β-mercaptopropionate) commercially available from Carlisle Chemical Co. under the trade name of "Q-43" and 0.30 g. of cyclohexanone oxime benzoate. The thus formed admixture was applied to the surface of two pieces of aluminum foil (1.5 mil thick) by means of a Baker film applicator to a depth of 1 mil. A solution of 3 g. of ferric ammonium sulfate in 200 ml. of water was prepared. The coated foils were immersed in the iron-containing solution for 5 seconds, removed, and the coated surfaces on each foil were place in contact with one another by hand pressing. After 2 minutes an attempt was made to pull the two aluminum foils apart which resulted in the foils tearing and substantially no injury to the hardened polythioether adhesive.

EXAMPLE VIII

Example VII was repeated, except that only one aluminum foil was coated with a 1 mil thick coating of the admixture prior to immersion in the iron-containing solution and contact with the other untreated aluminum foil. The results were substantially the same.

What is claimed is:
1. A process for coating a substrate which comprises
   1. applying to said substrate 0.0001 to 0.01 percent by weight of the polyene/polythiol composition of an iron-containing material selected from the group consisting of iron, iron oxides, iron salts, and iron chelates as a prime coat, said iron-containing material being the catalyst for curing the composition,
   2. applying to said prime coat a liquid curable composition comprising a polyene containing at least two reactive unsaturated carbon to carbon bonds per molecule, a polythiol containing at least two thiol groups per molecule, the total combined functionality of (a) the reactive unsaturated carbon to carbon bonds per molecule in the polyene and (b) the thiol groups per molecule in the polythiol being greater than four, and the weight ratio of the polyene to the polythiol being 2–98:98–B2, respectively, and 0.1–5 percent by weight of the polyene/polythiol composition of an oxime ester, and
   3. allowing the curable composition to harden under ambient conditions.
2. The process according to claim 1 wherein the polyene is the reaction product of polytetramethylene ether glycol having a molecular weight of about 1000, polytetramethylene ether glycol having a molecular weight of about 2000, tolylene diisocyanate and allyl isocyanate in a mole ratio of 1:1:1:2 respectively.
3. The process according to claim 1 wherein the polyene is a styrene/butadiene rubber.
4. The process according to claim 1 wherein the polyene is the reaction product of polytetramethylene ether glycol having a molecular weight of about 2000 and allyl isocyanate in a mole ratio of 1:2 respectively.
5. The process according to claim 1 wherein the polyene is the reaction product of a solid polyester diol and allyl isocyanate in a mole ratio of 1:2 respectively.
6. The process according to claim 1 wherein the polyene is the reaction product of polyoxypropylene diol having a molecular weight of about 2000, tolylene 2,4-diisocyanate and allyl alcohol in a mole ratio of 1:2:2 respectively.
7. The process according to claim 1 wherein the polyene is the reaction product of a phthalate or succinate esterol derived from polytetramethylene ether glycol and allyl isocyanate having a molecular weight of about 4000.
8. The process according to claim 1 wherein the polyene is the reaction product of polytetramethylene ether glycol having a molecular weight of about 3000 and allyl isocyanate in a mole ratio of 1:2 respectively.
9. The process according to claim 1 wherein the polyene is the reaction product of polyoxypropylene triol having a molecular weight of about 1000 to 6000 and allyl isocyanate in a mole ratio of 1:3 respectively.
10. The process according to claim 1 wherein the polyene is poly-1,3-butadiene.
11. The process according to claim 1 wherein the polyene is the triacrylate of the reaction product of trimethylol propane and about 3-30 moles of ethylene oxide.
12. The process according to claim 1 wherein the polyene is triallyl urea.
13. The process according to claim 1 wherein the polyene is cellulose acetate methacrylate.
14. The process according to claim 1 wherein the polyene is the reaction product of 1,4-butanediol and allyl isocyanate in a mole ratio of 1:2 respectively.
15. The process according to claim 1 wherein the polyene is formed by reacting either
   a. an organic epoxide containing at least two

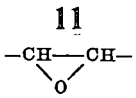

groups in its structure with a member of the group consisting of hydrazine, primary amines, secondary amines, tertiary amines, amine salts, organic alcohols and organic acids wherein said group member contain at least one organic substituent containing a reactive ethylenically or ethynylically unsaturated group, or b. an organic epoxide containing at least one organic substituent containing a reactive ethylenically or ethynylically unsaturated group with a member of the group consisting of hydrazine and an organic material containing at least two active hydrogen functions from the group consisting of

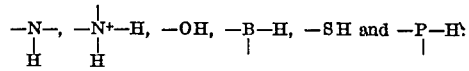

16. The process according to claim 15 wherein the polyene is the reaction product of 1 mole of diglycidyl ether of Bisphenol A and 2 moles of allyl amine.

17. The process according to claim 15 wherein the polyene is the reaction product of 1 mole of diglycidyl ether of Bisphenol A and 2 moles of allyl hydrazine.

18. The process according to claim 15 wherein the polyene is the reaction product of 1 mole of diglycidyl ether of Bisphenol A and 2 moles of diallyl amine.

19. The process according to claim 15 wherein the polyene is the reaction product of 1 mole of polyoxypropylenetriamine and 3 moles of allyl glycidyl ether.

20. The process according to claim 1 wherein the oxime ester is a member of the group consisting of dimethylglyoxime dibenzoate, glyoxime dibenzoate, 3-phenyl-4,5-dihydro-6-oxo-1,2-oxazine, cyclohexanone oxime benzoate, cycloheptanone oxime benzoate, and 2-methylcyclohexanone oxime benzoate.

21. A process for coating a substrate which comprises
1. applying to said substrate a liquid curable composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four and the weight ratio of the polyene to the polythiol being 2–98:98–B2, respectively,
2. applying as a top coat to said curable liquid composition an iron-containing material selected from the group consisting of iron, iron oxides, iron salts, and iron chelates, the amount of iron in the iron-containing material being in the range 0.0001 to 0.01 percent by weight of the polyene/polythiol composition, said iron-containing material being the catalyst for curing said composition, and
3. allowing the curable composition to harden under ambient conditions.

22. The process according to claim 21 wherein the polyene is the reaction product of polytetramethylene ether glycol having a molecular weight of about 1000, polytetramethylene ether glycol having a molecular weight of about 2000, tolylene diisocyanate and allyl isocyanate in a mole ratio of 1:1:1:2 respectively.

23. The process according to claim 21 wherein the polyene is a styrene/butadiene rubber.

24. The process according to claim 21 wherein the polyene is the reaction product of polytetramethylene ether glycol having a molecular weight of about 2000 and allyl isocyanate in a mole ratio of 1:2 respectively.

25. The process according to claim 21 wherein the polyene is the reaction product of a solid polyester diol and allyl isocyanate in the mole ratio of 1:2 respectively.

26. The process according to claim 21 wherein the polyene is the reaction product of polyoxypropylene diol having a molecular weight of about 2000, tolylene 2,4-diisocyanate and allyl alcohol in a mole ratio of 1:2:2 respectively.

27. The process according to claim 21 wherein the polyene is the reaction product of a phthalate or succinate esterol derived from polytetramethylene ether glycol and allyl isocyanate having a molecular weight of about 4000.

28. The process according to claim 21 wherein the polyene is the reaction product of polytetramethylene ether glycol having a molecular weight of about 3000 and allyl isocyanate in a mole ratio of 1:2 respectively.

29. The process according to claim 21 wherein the polyene is the reaction product of polyoxypropylene triol having a molecular weight of 1000–6000 and allyl isocyanate in a mole ratio of 1:3 respectively.

30. The process according to claim 21 wherein the polyene is a poly-1,3-butadiene.

31. The process according to claim 21 wherein the polyene is the triacrylate of the reaction product of trimethylol propane and about 3-30 moles of ethylene oxide.

32. The process according to claim 21 wherein the polyene is triallyl urea.

33. The process according to claim 21 wherein the polyene is cellulose acetate methacrylate.

34. The process according to claim 21 wherein the polyene is the reaction product of 1,4-butanediol and allyl isocyanate in a mole ratio of 1:2 respectively.

35. The process according to claim 21 wherein the polyene is formed by reacting either
a. an organic epoxide containing at least two

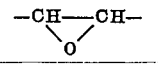

groups in its structure with a member of the group consisting of hydrazine, primary amines, secondary amines, tertiary amines amine salts, organic alcohols and organic acids wherein said group members contain at least one organic substituent containing a reactive ethylenically or ethynylically unsaturated group, or b. an organic epoxide containing at least one organic substituent containing a reactive ethylenically or ethynylically unsaturated group with a member of the group consisting of hydrazine and an organic material containing at least two active hydrogen functions from the group consisting of

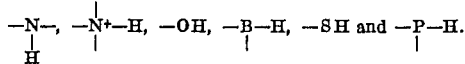

36. The process according to claim 21 wherein the polyene is the reaction product of 1 mole of diglycidly ether of Bisphenol A and 2 moles of allyl hydrazine.

37. The process according to claim 21 wherein the polyene is the reaction product of 1 mole of diglycidyl ether of Bisphenol A and 2 moles of allyl amine.

38. The process according to claim 21 wherein the polyene is the reaction product of 1 mole of diglycidyl ether of Bisphenol A and 2 moles of diallyl amine.

39. The process according to claim 21 wherein the polyene is the reaction product of 1 mole of polyoxypropylenetriamine and 3 moles of allyl glycidyl ether.

40. The process according to claim 21 wherein the oxime ester is a member of the group consisting of dimethylglyoxime dibenzoate, glyoxime dibenzoate, 3-phenyl-4,5-dihydro-6oxo-1,2-oxazine, cyclohexanone oxime benzoate, cycloheptanone oxime benzoate, and 2-methylcyclohexanone oxime benzoate.

41. A process for coating an iron substrate which comprises
(1) applying to said substrate a liquid curable composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four and the weight ratio of the polyene to the polythiol being 2–98:98–2, respectively, and (2) allowing the curable composition to harden under ambient conditions, said iron in said substrate being a catalyst for curing said composition.

* * * * *

PO-1050
(5/69)

UNITED STATES PATENT OFFICE
CERTIFICATE OF CORRECTION

Patent No. 3,650,802    Dated   March 21, 1972

Inventor(s)   Clifton L. Kehr and James L. Guthrie

It is certified that error appears in the above-identified patent and that said Letters Patent are hereby corrected as shown below:

In claim 1, column 10, line 25, delete the capital letter "B".
In claim 21, column 11, line 50, delete the capital letter "B".

Signed and sealed this 3rd day of October 1972.

(SEAL)
Attest:

EDWARD M. FLETCHER, JR.
Attesting Officer

ROBERT GOTTSCHALK
Commissioner of Patents